United States Patent
Gupta et al.

(10) Patent No.: US 11,290,551 B1
(45) Date of Patent: *Mar. 29, 2022

(54) METHOD AND SYSTEM FOR IMPLEMENTING CIRCLE OF TRUST IN A SOCIAL NETWORK

(71) Applicant: Twitter, Inc., San Francisco, CA (US)

(72) Inventors: Pankaj Gupta, Freeport, TX (US); Aneesh Sharma, San Francisco, CA (US); Ashish Goel, Stanford, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,233

(22) Filed: Sep. 4, 2020

Related U.S. Application Data

(63) Continuation of application No. 14/266,742, filed on Apr. 30, 2014, now Pat. No. 10,771,572.

(51) Int. Cl.
| | | |
|---|---|---|
| *H04L 29/08* | (2006.01) | |
| *G06Q 50/00* | (2012.01) | |
| *G06F 16/901* | (2019.01) | |
| *H04L 12/58* | (2006.01) | |
| *H04L 67/50* | (2022.01) | |
| *H04L 51/52* | (2022.01) | |

(52) U.S. Cl.
CPC .......... *H04L 67/22* (2013.01); *G06F 16/9024* (2019.01); *G06Q 50/01* (2013.01); *H04L 51/32* (2013.01)

(58) Field of Classification Search
CPC .......... H04L 67/22; G06Q 99/00; G06F 15/00
See application file for complete search history.

(56) References Cited

U.S. PATENT DOCUMENTS

| | | | | |
|---|---|---|---|---|
| 8,095,432 B1* | 1/2012 | Berman | ................. | G06Q 10/10 705/26.7 |
| 8,498,999 B1 | 7/2013 | Bhalotia | | |
| 8,825,759 B1* | 9/2014 | Jackson | ................. | H04L 67/02 709/204 |
| 10,771,572 B1* | 9/2020 | Gupta | ................. | G06Q 50/01 |
| 2008/0091834 A1 | 4/2008 | Norton | | |
| 2009/0210244 A1 | 8/2009 | Koister et al. | | |

(Continued)

OTHER PUBLICATIONS

Backstrom, Lars; Leskovec, Jure; "Supervised Random Walks: Predicting and Recommending Links in Social Networks"; Feb. 9, 2011; Stanford University; Palo Alto, CA, USA (Year: 2011).*

(Continued)

*Primary Examiner* — Backhean Tiv
*Assistant Examiner* — Jihad K Boustany
(74) *Attorney, Agent, or Firm* — Fish & Richardson P.C.

(57) ABSTRACT

A method for determining a circle of trust (CoT) includes receiving a request for the CoT, generating the CoT for the context account by: identifying a primary graph with nodes based on at least one action within a social network for the context account. The method further includes performing random walks through the nodes of the primary graph, each of the random walks including two steps, ranking each of the nodes based on an amount of the random walks that end on each of the nodes, with the CoT including a number of the highest ranking plurality of nodes, filtering content items using the CoT to identify a subset of relevant items, and providing the subset for display on a client device.

29 Claims, 10 Drawing Sheets

(56) References Cited

U.S. PATENT DOCUMENTS

| | | |
|---|---|---|
| 2010/0132049 A1 | 5/2010 | Vernal et al. |
| 2011/0035674 A1* | 2/2011 | Chenoweth ......... G06F 16/2457 |
| | | 715/745 |
| 2011/0296004 A1 | 12/2011 | Swahar |
| 2011/0307494 A1 | 12/2011 | Snow |
| 2012/0124073 A1* | 5/2012 | Gross ................... G06F 16/954 |
| | | 707/767 |
| 2012/0166929 A1 | 6/2012 | Henderson et al. |
| 2012/0173500 A1 | 7/2012 | Chakrabarti et al. |
| 2012/0290950 A1* | 11/2012 | Rapaport ........... H04N 21/8358 |
| | | 715/753 |
| 2012/0330864 A1 | 12/2012 | Chakrabarti et al. |
| 2013/0031171 A1 | 1/2013 | Serena |
| 2013/0073546 A1 | 3/2013 | Yan et al. |
| 2013/0097184 A1* | 4/2013 | Berkhin ................ G06F 16/23 |
| | | 707/748 |
| 2013/0226912 A1 | 8/2013 | Agapiev |
| 2013/0291098 A1 | 10/2013 | Chung et al. |
| 2014/0196110 A1* | 7/2014 | Rubinstein ............. G06F 21/57 |
| | | 726/3 |
| 2014/0297740 A1* | 10/2014 | Narayanan ............ G06Q 10/10 |
| | | 709/204 |
| 2015/0019640 A1* | 1/2015 | Li ............................ G06F 3/00 |
| | | 709/204 |
| 2017/0178157 A1* | 6/2017 | Jayaram ............ G06Q 30/0244 |

OTHER PUBLICATIONS

Backstrom et al.,"Supervised Random Walks: Predicting and Recommending Links in Social Networks," Feb. 9, 2011, Stanford University, Palo Alto, CA, USA (Year: 2011).

Gupta et al., "WTF: The Who to Follow Service at Twitter," International World Wide Web Conference Committee (IW3C2), May 13, 2013, 10 pages.

Kyrola, "DrunkardMob: Billions of Random Walks on Just a PC," Carnegie Mellon University, Oct. 13, 2013, 8 pages.

\* cited by examiner

METHOD AND SYSTEM FOR IMPLEMENTING CIRCLE OF TRUST IN A SOCIAL NETWORK

CROSS-REFERENCE TO RELATED APPLICATIONS

This application is a continuation application of, and claims priority to, U.S. patent application Ser. No. 14/266,742, for Method and System for Implementing Circle of Trust in a Social Network, filed on Apr. 30, 2014, and now U.S. Pat. No. 10,771,572. The disclosure of the foregoing application is incorporated here by reference.

BACKGROUND

Social networks are based around connecting users with each other, to enable the exchange of information. Out of the millions of users of a social network, and the tens of millions (or more) of actions taken within the social network every day, it is a challenging problem to determine which actions, if any, should be presented to a given user. If the actions presented are not interesting and/or meaningful to the user, then the user may spend less time on the social network. Alternatively, if the actions presented are interesting and/or meaningful to the user, then the user may spend more time on the social network.

SUMMARY

In general, in one or more aspects, the invention relates to a method for determining a circle of trust (CoT) of a context account, comprising: receiving, by a computer processor, a request for the CoT, wherein the request comprises the context account, generating, by the computer processor and in response to the request, the CoT for the context account by: identifying a primary graph for the context account, wherein the primary graph comprises a plurality of nodes representing accounts of a social network, performing a plurality of random walks through the plurality of nodes of the primary graph, wherein each of the plurality of random walks includes two steps, and ranking each of the plurality of nodes based on an amount of the plurality of random walks that end on each of the plurality of nodes, wherein the CoT comprises a number of the highest ranking plurality of nodes, filtering a plurality of content items of the social network using the CoT to identify a subset of relevant items; and providing the subset for display on a client device.

In general, in one or more aspects, the invention relates a method for determining a temporary circle of trust (CoT) of a context account, comprising: receiving, from a client and by a computer processor, a request for the temporary CoT, wherein the request comprises the context account, identify at least one followed account, wherein the followed account is followed by the context account; access a CoT of the at least one followed account, identify a plurality of accounts with a direct relationship to the followed account, generate, using the at least one followed account and the plurality of accounts, a temporary graph, assign a weight, by the computer processor and using the temporary graph, to the at least one followed account and each of the plurality of accounts based on a number of paths to the at least one followed account and each of the plurality of accounts, and generate the temporary CoT by ranking the at least one followed account and each of the plurality of accounts using the weight, wherein the temporary CoT is generated in real time.

In general, in one or more aspects, the invention relates to a system for determining a circle of trust (CoT) of a context account, comprising: a CoT module, executing on a computer processor, and configured to: receive a request for the CoT, wherein the request comprises the context account, generate, in response to the request, the CoT for the context account by: identifying a primary graph for the context account, wherein the directed graph comprises a plurality of nodes representing accounts of a social network, performing a plurality of random walks through the plurality of nodes of the primary graph, wherein each of the plurality of random walks includes two steps, and ranking each of the plurality of nodes based on an amount of the plurality of random walks that end on each of the plurality of nodes, wherein the CoT comprises a number of the highest ranking plurality of nodes, filter a plurality of content items of the social network using the CoT to identify a subset of relevant items; and provide the subset for display on a client device.

In general, in one or more aspects, the invention relates to a non-transitory computer readable storage medium comprising computer program code for determining a circle of trust (CoT) of a context account. The computer program code, when executed on a computer processor, includes functionality to enable the computer processor to: receive a request for the CoT, wherein the request comprises the context account, generate, in response to the request, the CoT for the context account by: identify a primary graph for the context account, wherein the primary graph comprises a plurality of nodes representing accounts of a social network, perform a plurality of random walks through the plurality of nodes of the primary graph, wherein each of the plurality of random walks includes two steps, and ranking each of the plurality of nodes based on an amount of the plurality of random walks that end on each of the plurality of nodes, wherein the CoT comprises a number of the highest ranking plurality of nodes, filter a plurality of content items of the social network using the CoT to identify a subset of relevant items; and provide the subset for display on a client device.

Other aspects and advantages of the invention will be apparent from the following description and the appended claims.

DETAILED DESCRIPTION

Figure 1:
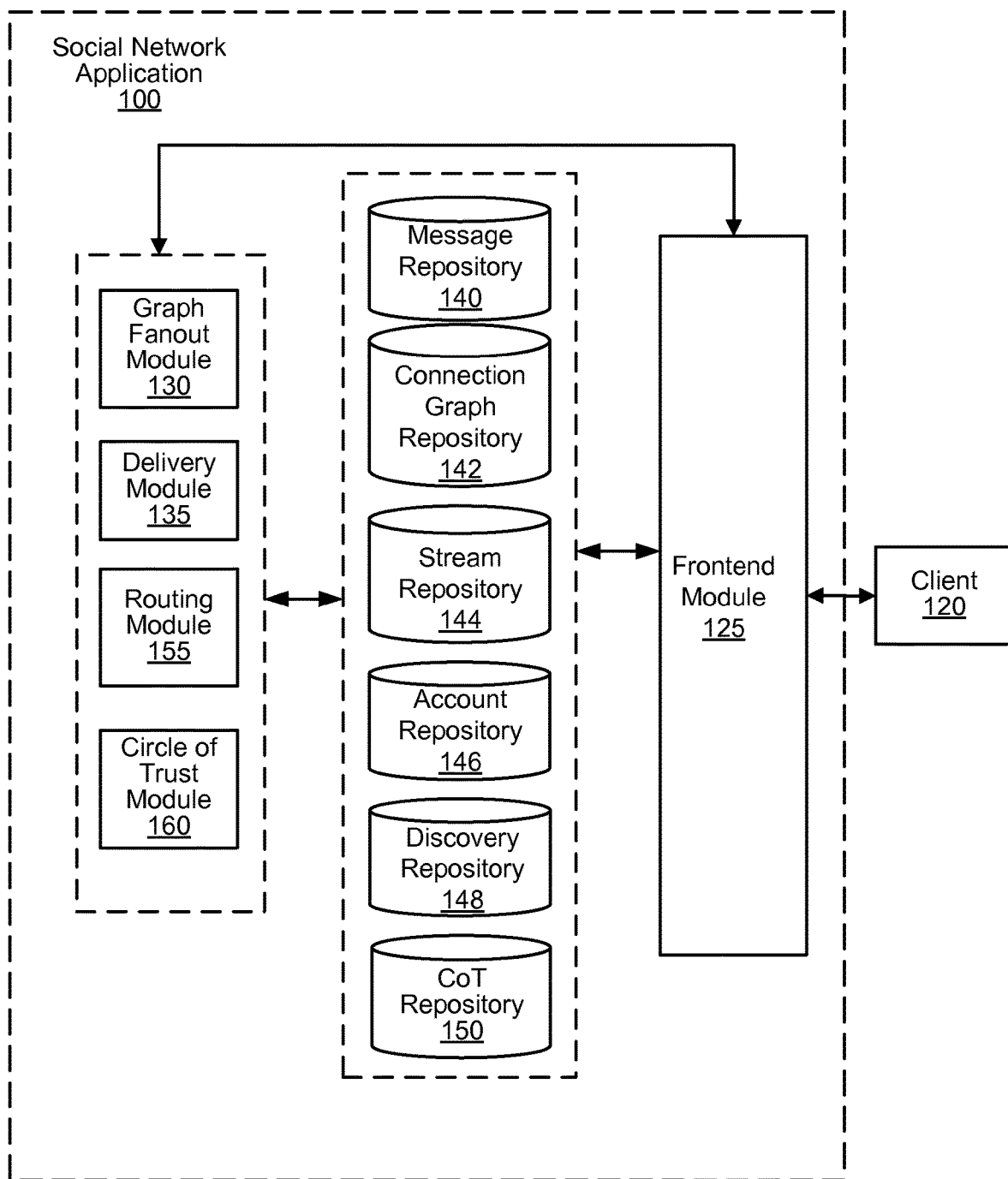
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for determining a circle of trust (CoT) of a context account. Initially, a request is received for the CoT. Then a CoT is generated for the context account by identifying a directed graph based on at least one action within the social network and a performing many random walks of two steps across the nodes of the graph. The nodes are ranked based on how many random walks ended on each node, and the CoT is generated from the ranking. Then, a variety of actions may be taken using the CoT.

In one or more embodiments of the invention, a CoT is a group of accounts that the user of a context account is more likely to "trust." In one or more embodiments of the invention, a context account is the account for which the CoT is being generated. The CoT is specific to the context account for which it was generated. In other words, any given account within a social network has a CoT, and the CoT is highly likely to be unique to the context account for which it was generated. Once generated, the CoT may be used to better the user experience within the social network by improving the functionality of the social network and/or improving the quality of content displayed to the user of the social network. For example, the CoT may be used to promote suggested accounts which the user may be interested in following or communicating with. Additionally, the CoT may be used to improve the content displayed to the user, by using the CoT to display content generated by members of the CoT more often than non-members. The CoT may also be used by other applications and/or aspects of the social network such as using the CoT to improve auto-complete results when the user is searching, assigning interests to the context account based on the interests of the members of the CoT for the context account, and/or any other actions.

FIG. 1 shows a schematic diagram of a system in accordance with one or more embodiments of the invention. Specifically, FIG. 1 shows a social network application (100) and a client (120) in accordance with one or more embodiments of the invention. The social network application (100) may also be referred to as a messaging platform in accordance with one or more embodiments of the invention.

A social network application (100) connects users to other users of the social network application (100), exchanges social networking messages between connected users of the social network application (100), and provides an interface for a user to create and view social network messages (e.g., via client (120)). In one or more embodiments of the invention, social network messages are broadcast social networking messages that are transmitted to at least a set of users. The users in the set may be self-selected (e.g., followers of the transmitting user) or users that satisfy a certain status with the transmitting user (e.g., belong to a group such as friends, family, etc.). The social networking messages may include, but is not limited to, a comment from a user, a reference to a network location, personal status update, an official statement by a user representing an organization, a reference to another user of the social network, one or more terms descriptive of the message, an offer to buy or sell goods, and other information not listed above. The social networking messages may also include, but is not limited to, text, universal resource locators (URLs), pictures, media files, multimedia files, and other elements not listed above. In one or more embodiments of the invention, the social network application (100) may include restrictions on the size of messages, such as a restriction on number of characters, size of included media, and other restrictions not listed above.

As shown in FIG. 1, the social network application (100) has multiple components including a frontend module (125), a graph fanout module (130), a delivery module (135), a message repository (140), a connection graph repository (142), a stream repository (144), an account repository (146), a discovery repository (148), a CoT repository (150), a routing module (155), and a circle of trust module (160). Various components of the social network application (100) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g., a local area network (LAN), the Internet, etc.) using any combination of wired and wireless connections using any combination of communication protocols. Those skilled in the art will appreciate that there may be more than one of each separate component running on a device, as well as any combination of these components within a given embodiment of the invention.

In one or more embodiments of the invention, the social network application (100) is a platform for facilitating real-time communication between one or more entities. For example, the social network application (100) may store millions of accounts of individuals, businesses, and/or other entities (e.g., pseudonym accounts, novelty accounts, etc.). One or more users of each account may use the social network application (100) to send social networking messages to other accounts inside and/or outside of the social network application (100). The social network application (100) may be configured to enable users to communicate in "real-time", i.e., to converse with other users with a minimal delay and to conduct a conversation with one or more other users during concurrent (which may include simultaneous) sessions. In other words, the social network application (100) may allow a user to broadcast social networking messages and may display the social networking messages to one or more other users within a reasonable time frame so as to facilitate a "live" conversation between the users. Recipients of a social networking message may have a predefined graph relationship with an account of the user broadcasting the social networking message. In one or more embodiments of the invention, the user is not an account holder or is not logged in to an account of the social network application (100). In this case, the social network application (100) may be configured to allow the user to broadcast social networking messages and/or to utilize other functionality of the social network application (100) by associating the user with a temporary account or identifier.

Figure 2:
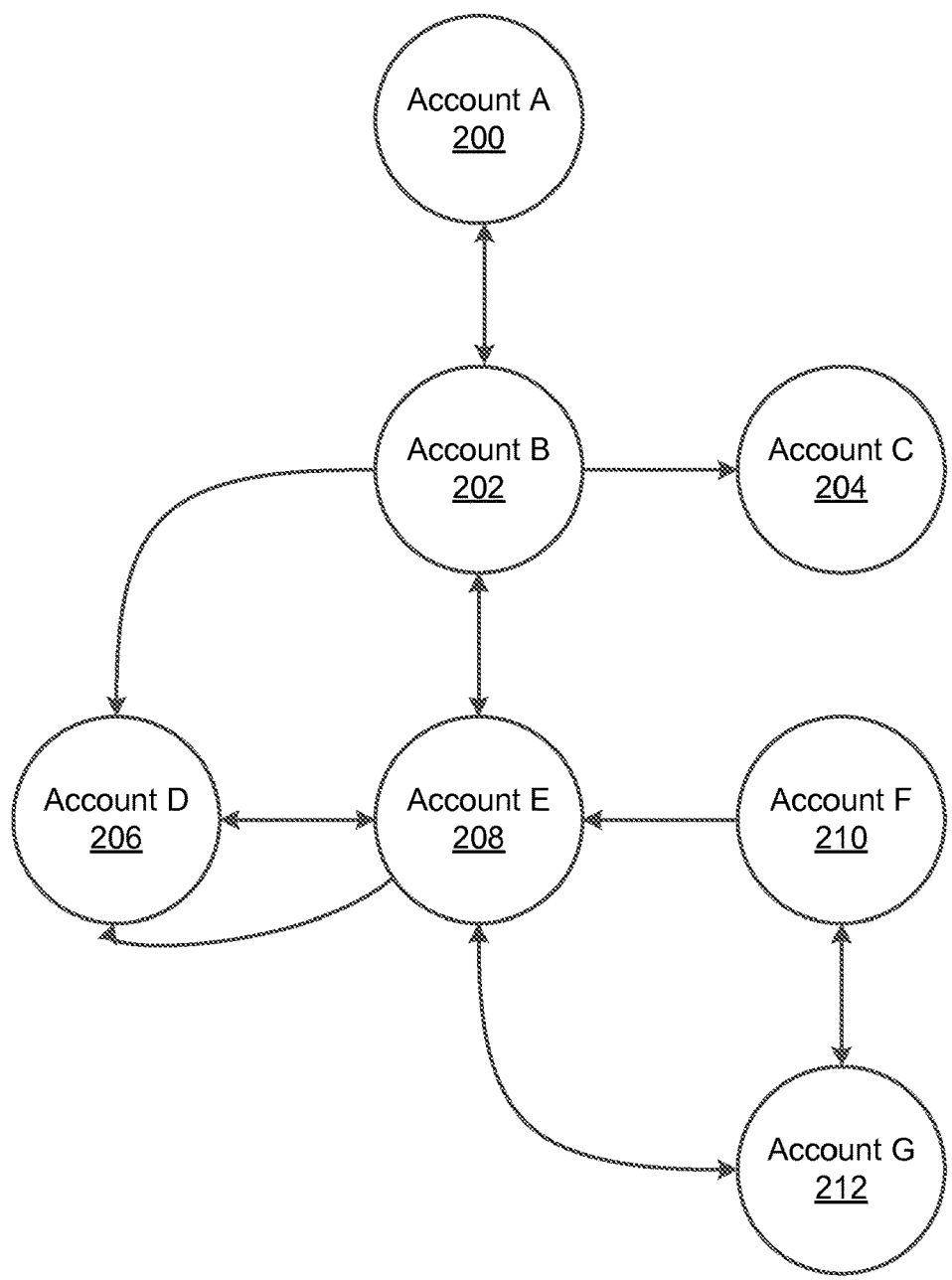
FIG. 2 shows an example connection graph in accordance with one or more embodiments of the invention.

In one or more embodiments of the invention, the connection graph repository (142) is configured to store one or more connection graphs. FIG. 2 shows an example depiction of a connection graph (299) in accordance with one or more embodiments of the invention. As shown in FIG. 2, the connection graph (299) has multiple components including nodes representing accounts of the social network application (100) (i.e., Account A (200), Account B (202), Account C (204), Account D (206), Account E (208), Account F (210), Account G (212)) and edges connecting the various nodes.

The connection graph (299) is a data structure representing relationships (i.e., connections) between one or more accounts. The connection graph (299) represents accounts as nodes and relationships as edges connecting one or more nodes. A relationship may refer to any association and/or action between the accounts (e.g., following, friending, subscribing, tracking, liking, tagging, messages, commenting, mentioning, and/or etc.). The edges of the connection graph (299) may be directed and/or undirected based on the type of relationship (e.g., bidirectional, unidirectional), in accordance with various embodiments of the invention. Although not shown in connection graph (299), in one or more embodiments, the edges and/or nodes of connection graph (299) may be assigned weights. The weights may represent the quality and/or quantity of interaction between the nodes on either side of the edge. In other words, the weights may represent the strength of a relationship between two nodes. The weights may be calculated in any manner now known or later developed.

In one or more embodiments of the invention, there are two different kinds of relationships within the connection graph (299): direct and extended. A direct relationship occurs when a given account is directly connected to a second account. For example, Account F (210) is directly connected to Account E (208). An extended relationship occurs when a given account is indirectly connected to a second account (i.e., more than one step is necessary to reach the second account). For example, Account F (210) has an extended relationship with Account B (202), as Account B (202) is connected to Account F (210) through Account E (208). In one or more embodiments of the invention, direct and extended relationships may be tracked, treated differently, and/or stored separately in a circle of trust and/or any associated data structure.

In one or more embodiments of the invention, connection graph (299) may be constructed using other actions and/or items in place of accounts. In other words, connection graph (299) may represent a graph of messages, favorites, interactions, applications installed on the client device, actions taken on the client device, etc., rather than a graph of accounts. In one or more embodiments of the invention, more than one graph may be used, and/or multiple different circles or trust may be generated. For example, a primary graph may be based on accounts, while a secondary graph may be based on messages. The different graphs may be used to generate different circle of trusts. In one or more embodiments of the invention, the primary graph is relatively stable, while the one or more secondary graphs change in real time based on the actions taken by users of a social network. It will be apparent to one of ordinary skill in the art, having the benefit of this disclosure, that there are many different items and/or actions on which to base a connection graph and, as such, the invention should not be limited to the above examples.

Returning to FIG. 1, in one or more embodiments of the invention, the routing module (155) includes functionality to receive one or more social networking messages and to store the social networking messages in the message repository (140). The routing module (155) may include functionality to assign an identifier to the social networking message and to store data about the social networking message. The routing module (155) may further include functionality to notify the graph fanout module (130) of a sender of the social networking message.

In one or more embodiments of the invention, the graph fanout module (130) includes functionality to retrieve graph data from the connection graph repository (142) and to use the graph data to determine which accounts in the social network application (100) should receive the social networking message. The graph data, for example, may reflect which accounts in the social network application are "following" a particular account and are, therefore, subscribed to receive status social networking messages from the particular account.

In one or more embodiments of the invention, the delivery module (135) includes functionality to receive a list of accounts from the graph fanout module (130) and the message identifier generated by the routing module (155) and to insert the message identifier into stream data associated with each identified account. The delivery module (135) may then store the message list in the stream repository (144). The data stored in the stream repository (144) ("stream data") may make up one or more streams associated with one or more accounts of the social network application (100). A stream may be a dynamic list of social networking messages associated with one or more accounts or may reflect any arbitrary organization of social networking messages that is advantageous for the user of an account.

In one or more embodiments of the invention, the frontend module (125) is a software application or a set of related software applications configured to communicate with external entities (e.g., client (120)). The frontend module (125) may include the application programming interface (API) and/or any number of other components used for communicating with entities outside of the social network application (100). The API may include any number of specifications for making requests from and/or providing data to the social network application (100).

In one or more embodiments of the invention, the frontend module (125) is configured to use one or more of the data repositories (e.g., message repository (140), connection graph repository (142), stream repository (144), account repository (146), discovery repository (148), and/or CoT repository (150)) to define streams for serving social networking messages (i.e., stream data) to a user of the account on the social network application (100). A user may use any client (120) to receive the social networking messages. The client may be may be implemented using any computing system (described below in FIG. 5). For example, where the user uses a web-based client to access the social network application (100), an API of the frontend module (125) may be utilized to define one or more streams and/or to serve the stream data to the client for presentation to the user. Similarly, different forms of message delivery may be handled by different modules in the frontend module (125). In one or more embodiments of the invention, the user may specify particular receipt preferences, which are implemented by the frontend module (125). In one or more embodiments of the invention, client (120) may store the CoT for the account(s) accessed using client (120).

In one or more embodiments of the invention, one or more of the data repositories (e.g., message repository (140), connection graph repository (142), stream repository (144), account repository (146), discovery repository (148), and/or CoT repository (150)) is a database and/or storage service residing on one or more servers. For example, one or more of the data repositories may be implemented as a storage service using service-oriented architecture (SOA) and configured to receive requests for data and to provide requested data to other components of the social network application (100). In another example, the message repository (140) may include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application may be used, in accordance with various embodiments of the invention.

In one or more embodiments of the invention, one or more of the data repositories (e.g., message repository (140), connection graph repository (142), stream repository (144), account repository (146), discovery repository (148), and/or CoT repository (150)) is a separate application or set of applications residing on one or more servers external (and communicatively coupled) to the social network application (100). Alternatively, in one or more embodiments of the invention, one or more of the data repositories may be an integrated component of the social network application (100) and/or may reside, either partially or entirely, on one or more common hardware devices (e.g., a server).

In one or more embodiments of the invention, the discovery repository (148) may store document metadata about documents. The document metadata may include a list of keywords, tracking information, date of the document, a mapping between social media references and original references to documents, and other information.

In one or more embodiments of the invention, the message repository (140) includes functionality to store message data items that include social networking messages and social networking messages metadata. The social networking messages metadata may include, but is not limited to, an identifier of the originating user of the social networking message, a list of users who received the social networking message, a number of users who received the social networking message, statistics (e.g., a ratio of connected users to the originating user that forward the social networking message versus disconnected users to the originating user that forward the social networking message), time and date in which the social networking message is transmitted, and other information. The message repository may also include functionality to store engagement data items.

In one or more embodiments of the invention, the connection graph repository (142) stores information about users' connections. Specifically, the connection graph repository may relate user identifiers of a user to other users' identifiers, user's preferences, and history in the social network application (100). For example, the user preferences and history may include language, connections of the user, topics in which the user is interested, messages viewed and/or sent, actions taken, and/or other information.

In one or more embodiments of the invention, the account repository (146) stores information about users' accounts. Specifically, the account repository (146) may store account data items that include information about a location of a user, a self-description of the user, and interests of the user.

In one or more embodiments of the invention, the CoT repository (150) stores data generated by circle of trust module (160), such as a CoT for every account on the social network, and/or any other suitable data. The CoT repository (150) may store data in any manner now known or later developed.

In one or more embodiments of the invention, the CoT module (160) includes functionality for generating a CoT. CoT module (160) may also include functionality for updating a CoT, performing actions using the CoT, and/or any other suitable functionality. The CoT module (160) may generate a CoT for every user of the social network, and once generated, the CoT may be stored (e.g., in CoT repository (150)) for later access by clients (e.g., other applications, users, administrators, ads, third party programs, etc.). In one or more embodiments of the invention, the CoT module (160) is constantly generating CoTs and/or updating CoTs, regardless of whether or not a request has been received for a CoT. Alternatively, a specific CoT may be generated or updated directly in response to a request for the specific CoT. In one or more embodiments of the invention, the CoT are generated offline, in batches, due to the complexity of the calculations involved. Optionally, more than one CoT may be generated for each account.

In one or more embodiments of the invention, CoT module (160) may be implemented in Hadoop, thereby enabling many different computers/processors to contribute to the generation of CoTs. Alternatively, CoT module (160) may be implemented using any other computing system (defined below in FIG. 5). When implemented in Hadoop, CoT module (160) may utilize a connection graph in a map reduced form, and many separate computers/processors may separately contribute to the generation of a single CoT. In this implementation, CoT module (160) is constantly updating, generating, and/or refining CoTs for all accounts of the social network based on the latest actions taken within the social network. In other words, as the connection graph(s) of the social network and/or accounts of the social network changes, the CoT module (160) is constantly updating CoTs to provide the updated CoTs. Thus, the CoT repository (150) may store current, real-time CoTs for the various accounts of the social network.

In one or more embodiments of the invention, the CoT module (160) includes functionality for using a connection graph, such as the one described in FIG. 2, to generate a CoT for an account. Specifically, the connection graph may be a unidirectional, expander graph. An expander graph is a graph with strong connectivity properties. Due to the strong connectivity properties, any given user may be indirectly connected to the majority of the other users of the social network through a comparatively small amount of connections. Alternatively, the connection graph may be bidirectional and/or have weak connectivity properties. The CoT module (160) includes functionality to perform random walks on the connection graph for a context account. In one or more embodiments of the invention, the random walks are all of two steps. Alternatively, the random walks may be of any number of steps. Specifically, beginning at the context account, the CoT module (160) performs a random walk down an edge of the connection graph to a first node, then the same process is repeated (e.g., from the first node make a random walk down an edge of the connection graph to a second node, etc.) as many times as needed to reach a predetermined limit on the number of steps (e.g., two steps, etc). In one or more embodiments of the invention, any number of walks may be performed by the CoT module (160) while generating a CoT. Advantageously, enough walks should be performed to ensure that all reachable nodes of the graph have been visited at least once. For example, 500, 3,000, 15,000, 50,000, 175,000, or more randomized walks may be performed in order to generate a CoT for a given context account. As discussed above, the CoT may be generated for a graph based on accounts, messages, actions taken, etc., and/or more than one CoT may be generated for each account.

In one or more embodiments of the invention, the CoT module (160) includes functionality to perform the random walk(s) in a variety of ways. In one or more embodiments of the invention, the random walks may be performed sequentially. Alternatively, the random walks may be performed in parallel. In one or more embodiments of the invention, to perform a random walk, CoT module (160) assigns a number to each possible node of a given step, and generates a random number within the range of numbers assigned to the possible nodes to determine to which node a step will be made. For example, if there are five nodes available for a step, each assigned a number from 1-5, the random number generated may be 3, in which case a step would be made to the node associated with 3. As discussed above with respect to FIG. 2, the edges between the nodes may be weighted. The CoT module (160) can be configured to modify the likelihood of selecting each node according to the weight of the edge connecting to that node. Thus, for example, the process of performing the random walk can be modified to a weighted random walk. In one or more embodiments of the invention, CoT module (160) may use one or more formulas in place of random number generation to provide the same functionality as the random walks. For example, CoT module (160) may use the number of edges, number of nodes, and the weights assigned to each edge/node (if applicable), to mathematically calculate a value for each node, and the value may be used to rank the nodes. It will be apparent to one of ordinary skill in the art that there are many ways to perform random walks and/or mathematically calculate a value for a node and, as such, the invention should not be limited to the above examples.

In one or more embodiments of the invention, the CoT module (160) includes functionality to track the number of random walks that end on each of the nodes of a connection graph. The CoT module (160) may track the number of walks ending on each node in any manner now known or later developed. This number may then be used by the CoT module (160) to rank the nodes of the connection graph, and generate the CoT for the context account. In one or more embodiments of the invention, the CoT module (160) limits the CoT to a predetermined size, such as 500 accounts, 1000 accounts, less than 2000 accounts, and/or any other suitable size. The predetermined size may be set by a programmer, administrator, user, or any other suitable entity. In one or more embodiments of the invention, the size of the CoT may vary based on who is requesting it and/or what the CoT will be used for. For example, when used to refine auto-complete results, a CoT may be limited to 2000 accounts, but when used to determine what user generated content to display a CoT may be limited to 100 accounts.

In one or more embodiments of the invention, CoT module (160) includes functionality to generate a temporary CoT. A temporary CoT is used when a CoT has not yet been generated for an account (e.g., a new user, etc.) and/or when the connection graph associated with the account is changing rapidly (e.g., a returning user suddenly increases the account he follows from 5 to 50, etc.). The temporary CoT may be generated in real time, using the most current data available. In one or more embodiments of the invention, the temporary CoT is generated when the amount of accounts followed by the context account is below an account threshold value, and/or when the rate of change of the amount of accounts followed by the context account is above a change threshold. The thresholds may be set to any value by any entity such as a programmer, owner of the social network, etc. CoT module (160) may generate the temporary CoT based on the CoTs of the accounts directly followed by the context account. Specifically, in one or more embodiments of the invention, the direct relationships from each CoT of accounts followed are combined, and weighted based on the number of paths to each node, and ranked based on the weight. In one or more embodiments of the invention, the temporary CoT is used until a "normal" CoT may be generated for the account.

Figure 3A:
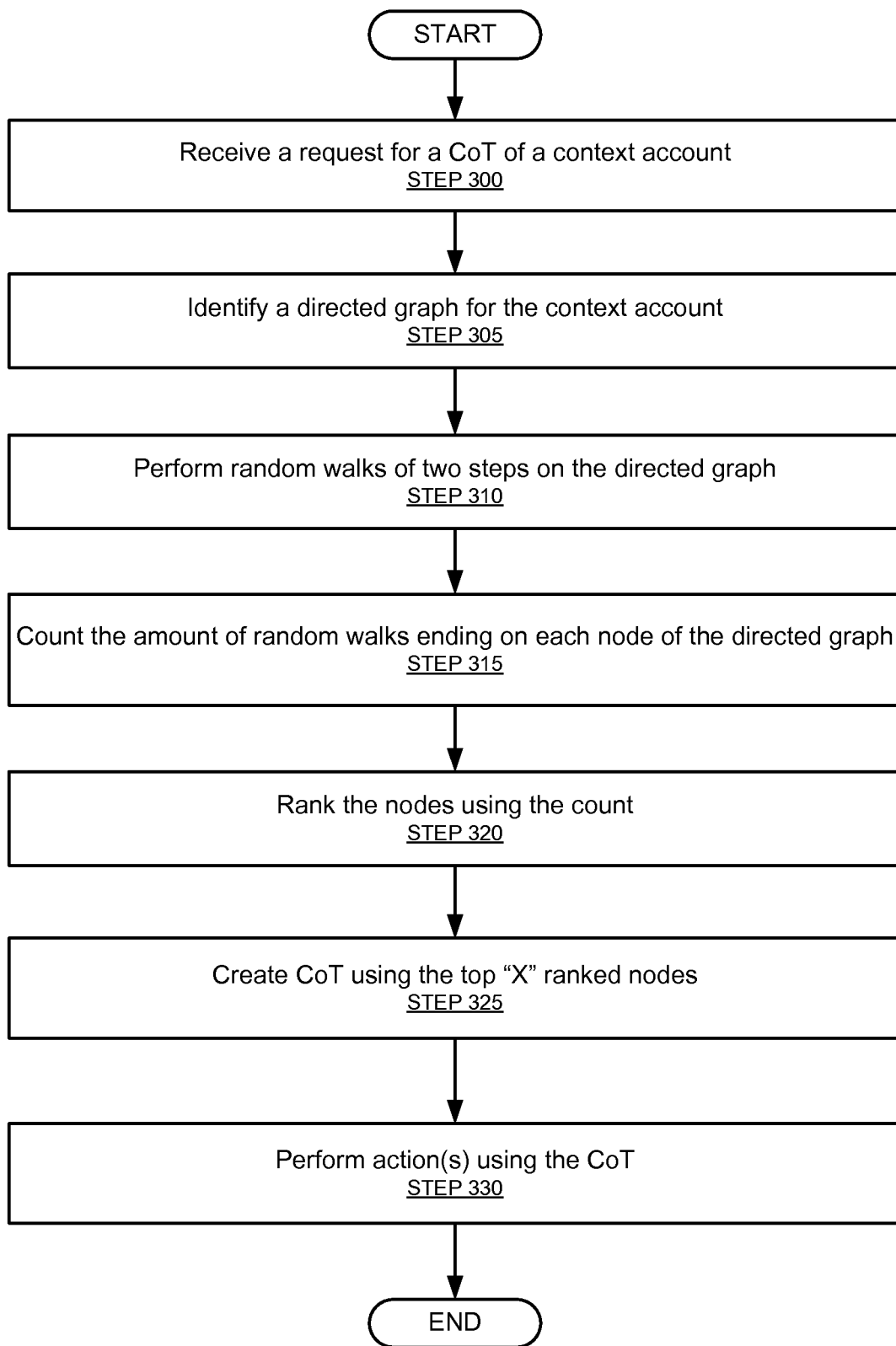
FIGS. 3A and 3B show a flowchart of a method in accordance with one or more embodiments of the invention.
Figure 3B:
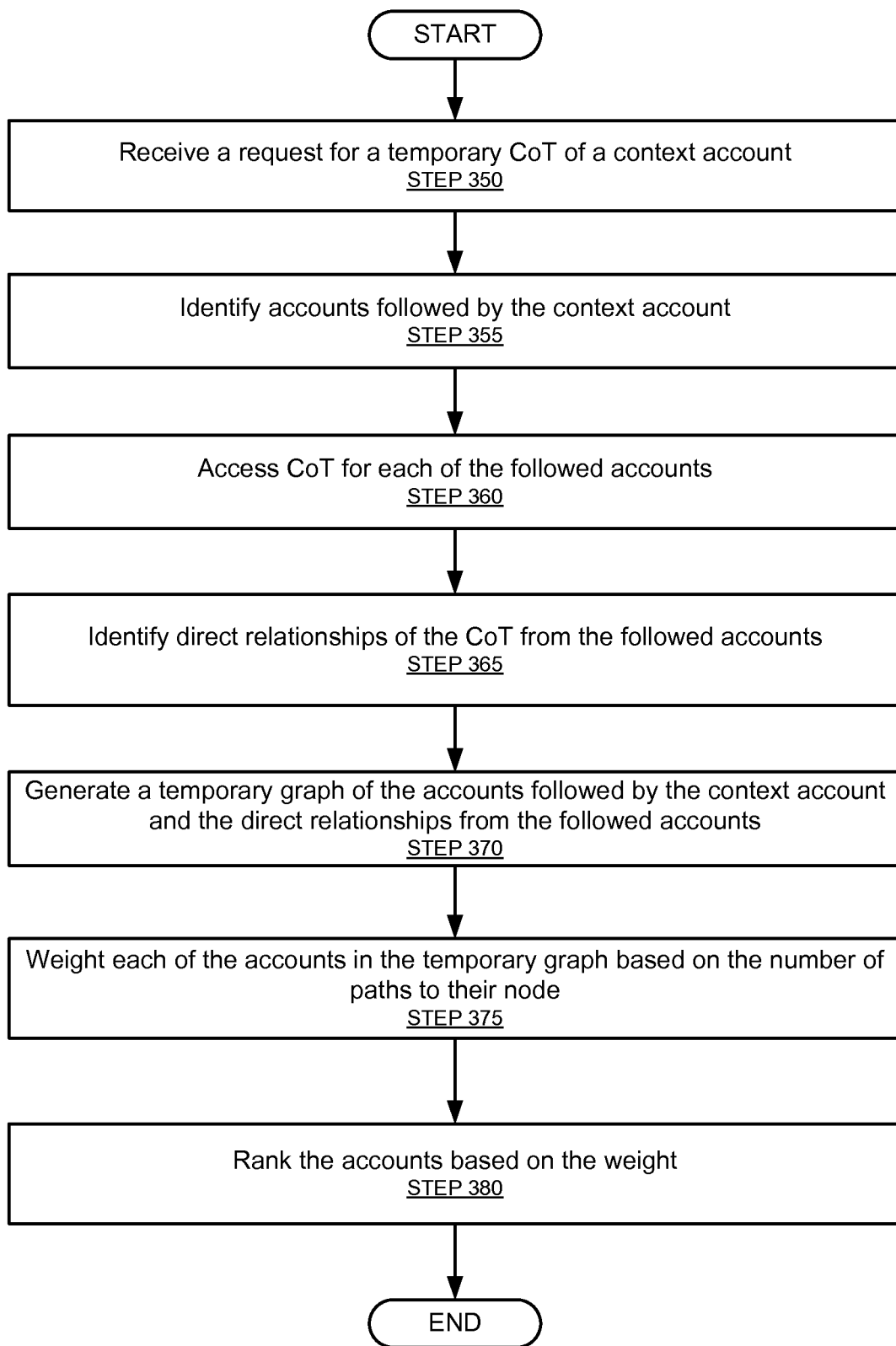

In one or more embodiments of the invention, the CoT module (160) includes functionality to implement the method shown in FIGS. 3A and 3B.

The invention is not limited to the system shown in FIG. 1. Further, though not shown in FIG. 1, any component in FIG. 1 may be connected to any other component shown in FIG. 1 without departing from the invention.

FIG. 3A shows a flowchart of a method for generating a CoT. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 3A should not be construed as limiting the scope of the invention.

In Step 300, a request for a CoT of a context account is received. The request may be received in any manner now known or later developed, and may originate from any source. For example, the request may originate from an application, module, and/or another component of a social networking application. Alternatively, the request may be received from a client and/or any other suitable entity. The request may identify the context account, if the request is not already associated with the context account. Optionally, the request may also identify the size of the requested CoT.

Although not shown, optionally, after Step 300 a decision may be made whether a CoT exists for the context account. If the CoT does exist, the steps of FIG. 3A may be used to update the CoT, or the existing CoT may be used without updating. If a CoT does not exist, one may be created using the Steps of FIG. 3A. Alternatively, if a CoT does not exist and a temporary CoT is needed (i.e., for a new user, returning user, or other situation where the connection graph is rapidly changing, etc.) then the method may proceed using the steps of FIG. 3B.

In Step 305, a directed graph for the context account is identified. In one or more embodiments, the directed graph is maintained by a social networking application and represents relationships amongst members of the social network. The directed graph may be a primary or a secondary graph. A primary graph has accounts as the nodes of the graph. A secondary graph may have messages, pictures, interests, and/or any other action taken within or on a social network as the nodes of the graph. The directed graph may be stored in a repository, such as connection graph repository (142) of FIG. 1. The directed graph may be identified in any suitable manner, such as by using the context account as a filter or search term. In one or more embodiments, the directed graph is unidirectional and an expander graph. Alternatively, the graph may be of any suitable type. Optionally, the directed graph may identified in and/or used in a map reduced form.

In Step 310, random walks of two steps are performed on the directed graph. Any number of random walks may be performed. For example, 50,000 random walks may be performed. In one or more embodiments, the random walks may be of any length, such as 3, 4, 5, 10, etc. In one or more embodiments of the invention, Step 310 is performed constantly, regardless of whether or not a CoT has been requested, resulting in CoTs that are constantly updated and current with real-time actions taken within the social network. Alternatively, Step 310 is performed in direct response to receiving the request in Step 300.

All random walks begin on the node representing the context account (i.e., the node at the "center" of the directed graph). The directed graph show relationships between nodes, and may also include directional information. In other words, Node A may be directly connected to Node B, but Node B may not be directly connected to Node A. Alternatively, some connections may be bidirectional. Random walks proceed by randomly picking a valid edge leaving the node representing the context account, and moving to a second node connected with the edge. The step is then repeated, starting at the second node, and a new valid edge leaving the second node is randomly selected, and the random walk ends at the third node that is connected by the valid edge leaving the second node. The third node would have its count increased, as described below in Step 315.

In Step 315, the number of random walks ending on each node of the directed graph are counted. Specifically, the number of random walks ending on each node is generated during Step 310, as each random walk is performed/completed. The amount may be counted in any way now known or later developed. The amount may be constantly updated, such that the count is current whether or not a CoT has been requested. Alternatively, the counts for each node may be tallied/updated in direct response to receiving a request.

In Step 320, the nodes are ranked using the count. The nodes may be ranked in any manner now known or later developed. The nodes may be ranked from most count to least count, or in any other suitable manner.

In Step 325, the CoT is created using the top "X" ranked nodes. The CoT may include any number of accounts, such as 500, 1000, fewer than 2000, etc. The size of the CoT may be set by any suitable individual, such as a programmer, engineer, administrator, etc. In one or more embodiments, the size of the CoT may vary depending on who is asking for the CoT, or what the CoT will be used for. For example, a first application may need a CoT of size 500, while a second application may need a CoT of size 1000. Optionally, in one or more embodiments of the node, every node (or some large number of nodes) that received at least a single count may be stored in a data structure, and the top "X" ranked nodes may be returned in response to a request for a CoT.

In Step 330, actions are performed using the CoT. The CoT may be used in many different ways. For example, the CoT may be used to suggest new accounts for the context account to follow, friend, and/or interact with. Because the new accounts are in the circle of trust of the context account, the user of the context account is more likely to be interested in interacting with those accounts.

As another example, the CoT may be used to promote and/or refine what user generated content is displayed to the user of the context account, with content from members of the CoT receiving a boost and/or being displayed more often or more prominently. For example, the SN regularly displays content generated by members of the SN to the user of the context account in an attempt to improve engagement and ensure that the user of the content account will continue to use the SN. However, deciding what content to display to the user of the context account is a challenge, especially if there is a large amount of content generated—if over 1,000 messages have been sent since the last time the user of the context account used the SN, what messages should be shown to the user of the context account? In addition to other factors, the CoT may be used to help narrow down which messages to display to the user of the context account. Thus, after the 1,000 messages have been narrowed down to the most popular 50 messages, those 50 messages may be filtered by the CoT of the context account to eliminate messages that were not created by members of the CoT of the context account. Then, a lesser number of messages may remain, such as 10, which would then be presented to the user of the context account.

As another example, a CoT may be used to improve the accuracy of auto-complete. In this example, when a user is performing a search (or any other function that includes typing or entering information, etc.) for an account on the social network, the auto-complete may use the CoT to further refine and/or prioritize the results of the auto-complete function. Thus, if there are two possible results for an auto-complete, "Danny" and "Daniel", if Danny is in the user's CoT then when the user has typed "Dan" the auto-complete would display "Danny" instead of "Daniel."

As another example, the CoT may be used to assign interests to the user of the context account, based on the members of the CoT for the context account. Thus, if many members of a CoT like horror movies, then the context account may be identified as liking horror movies as well, even without the user of the context account explicitly stating so.

As additional examples, the Cot may be used in conjunction with one or more secondary graphs which change in real time, such as a graph of messages. These secondary graph may be used to determine messages members of a given CoT like, identify authors similar to those in a given CoT, identify messages members of a given CoT engage with, identify accounts members of a given CoT engage with, etc. It will be apparent to one of ordinary skill in the art that a CoT may be used in many different ways and, as such, the invention should not be limited to the above examples.

FIG. 3B shows a flowchart of a method for generating a temporary CoT. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 3B should not be construed as limiting the scope of the invention.

In Step 350, a request is received for a temporary CoT of a context account. The request may be received in the same ways as discussed above, with regards to Step 300. In one or more embodiments of the invention, the temporary CoT may be created and/or updated dynamically, in response to a client request. This may be in contrast to a "normal" CoT, which may be updated once a day, for example. The temporary CoT may be updated every time the context account follows a new account, performs an action, requests a CoT, and/or etc.

In Step 355, accounts followed by the context account are identified. The accounts may be identified in any manner now known or later developed. In one or more embodiments of the invention, a connection graph of the context account may be accessed to identify the followed accounts. An account is followed when a user chooses to receive updates/creates a relationship with the followed account.

In Step 360, a CoT for each of the followed accounts is accessed. The CoT may be accessed in any manner now known or later developed. The CoT for each of the followed accounts may be generated using, for example, the method described in FIG. 3A.

In Step 365, direct relationships of the CoT from the followed accounts are identified. The direct relationships are $1^{st}$ degree relationships with respect to the each of the followed accounts (i.e., accounts that the followed accounts follow, etc.). The direct relationships may be identified in any manner now known or later developed.

In Step 370, a temporary graph of the accounts followed by the context account and the direct relationships from the followed accounts is generated. The temporary graph is generated in any manner now known or later developed, and is generated to enable calculations to be performed using the temporary graph. In one or more embodiments of the invention, the temporary graph is updated each time the context account follows a new account. In one or more embodiments of the invention, Step 370 is optional.

In Step 375, each of the accounts in the temporary graph is weighted based on the number of paths to their node. The accounts may be weighted in any suitable manner. For example, each path to the node may attribute a weight of 1 to the account at the end of the path. In one or more embodiments of the invention, the directly followed accounts may not receive a weight. It will be apparent to one of ordinary skill in the art, having the benefit of this disclosure, that there are many ways to assign weight and, as such, the invention should not be limited to the above examples.

In Step 380, the accounts are ranked based on the weight. In one or more embodiments of the invention, even if the directly followed accounts did not receive a weight, they may be included in the temporary CoT. The accounts may be ranked in any manner now known or later developed. Once the accounts are ranked, if there are too many accounts, a subset may be selected to create the temporary CoT, such as the top 100, 300, 500, etc. The temporary CoT may be used in all of the same ways as a "normal" CoT as discussed above in Step 330. In one or more embodiments of the invention, the temporary CoT is used for a limited amount of time, and is substantially less taxing to generate than a "normal" CoT.

The following section describes various examples of the invention. The examples are included to aid in the understanding of the invention and are not intended to limit the scope of the invention.

Figures 4A, 4B:
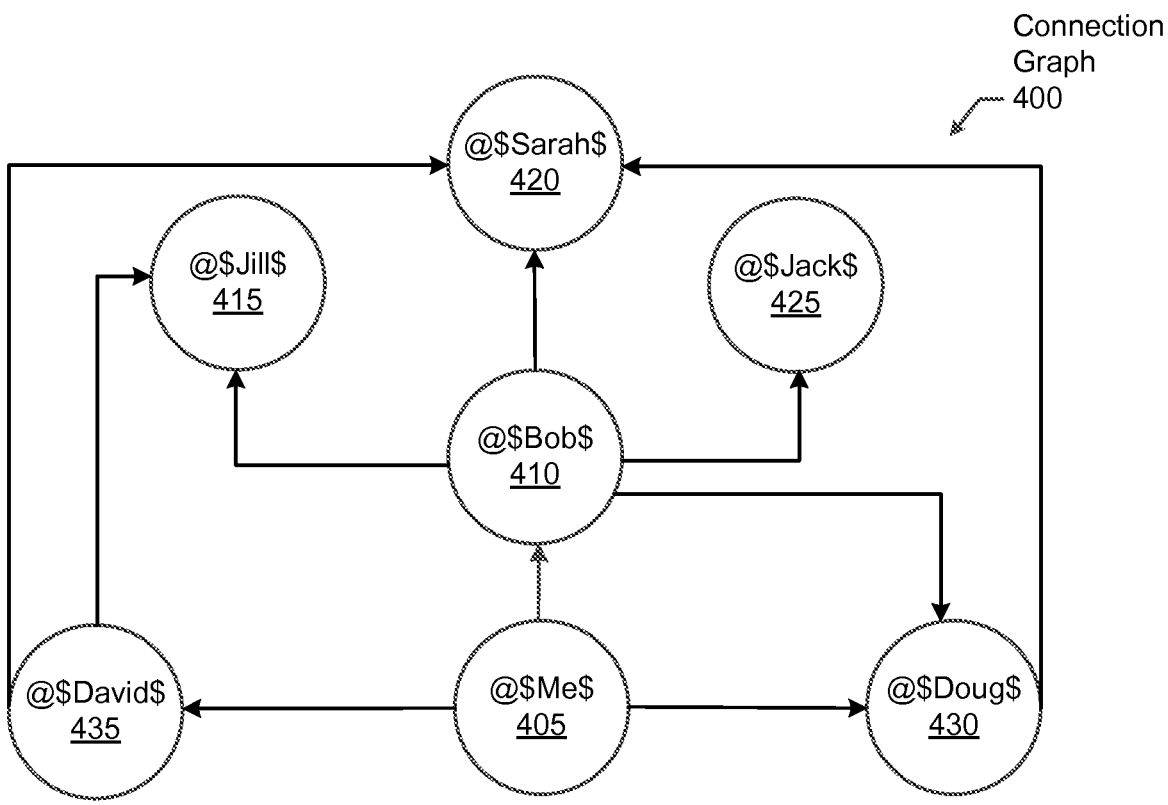
FIGS. 4A-4E show an example in accordance with one or more embodiments of the invention.

FIG. 4A shows an example connection graph (400) for an account on a social network, the account is called: @$Me$ (405). Thus, @$Me$ (405) is the context account for connection graph (400). Specifically, connection graph (400) is a directed graph showing who the user of @$Me$ (405) follows, as well as who the followed accounts follow. The follows are denoted by the directed edges between the various nodes of connection graph (400). The @$Me$ (405) follows @$Bob$ (410), @$David$ (435), and @$Doug$ (430), while @$Bob$ (410) follows @$Jill$ (415), @$Jack$ (425), and @$Doug$ (430), while @$Doug$ (430) follows @$Sarah$ (420), and @$David$ (435) follows @$Sarah$ (420). Connection graph (400) may be used to generate a CoT for @$Me$ (405). In doing so, thousands of random walks of length two are made starting from @$Me$ (405). Thus, a random walk may consist of a first step from @$Me$ (405) to @$Bob$ (410), and a second step from @$Bob$ (410) to @$Jack$ (425). The random walks then ends, a counter tracking how many walks end on @$Jack$ (425) is incremented, and another random walk is performed beginning from @$Me$ (405) (as needed), In this example, 1200 random walks are performed. The results of those random walks are shown in FIG. 4B, which shows the CoT (450) of @$Me$ (405). CoT (450) shows that 514 walks ended on @$Sarah$, 342 walks ended on @$Jill$, and 172 walks ended on @$Jack$ and @$Doug$. In a non-simplified example, a CoT may have hundreds, if not thousands (or more) members, and may be limited to the top 500, 1000, less than 3000, etc. accounts. Further, in a non-simplified example, more of the accounts directly followed by @$Me$ (405) (i.e., @$Bob$ (410), @$Doug$ (430), and @$David$ (435)) may be included in the CoT.

Figure 4C:
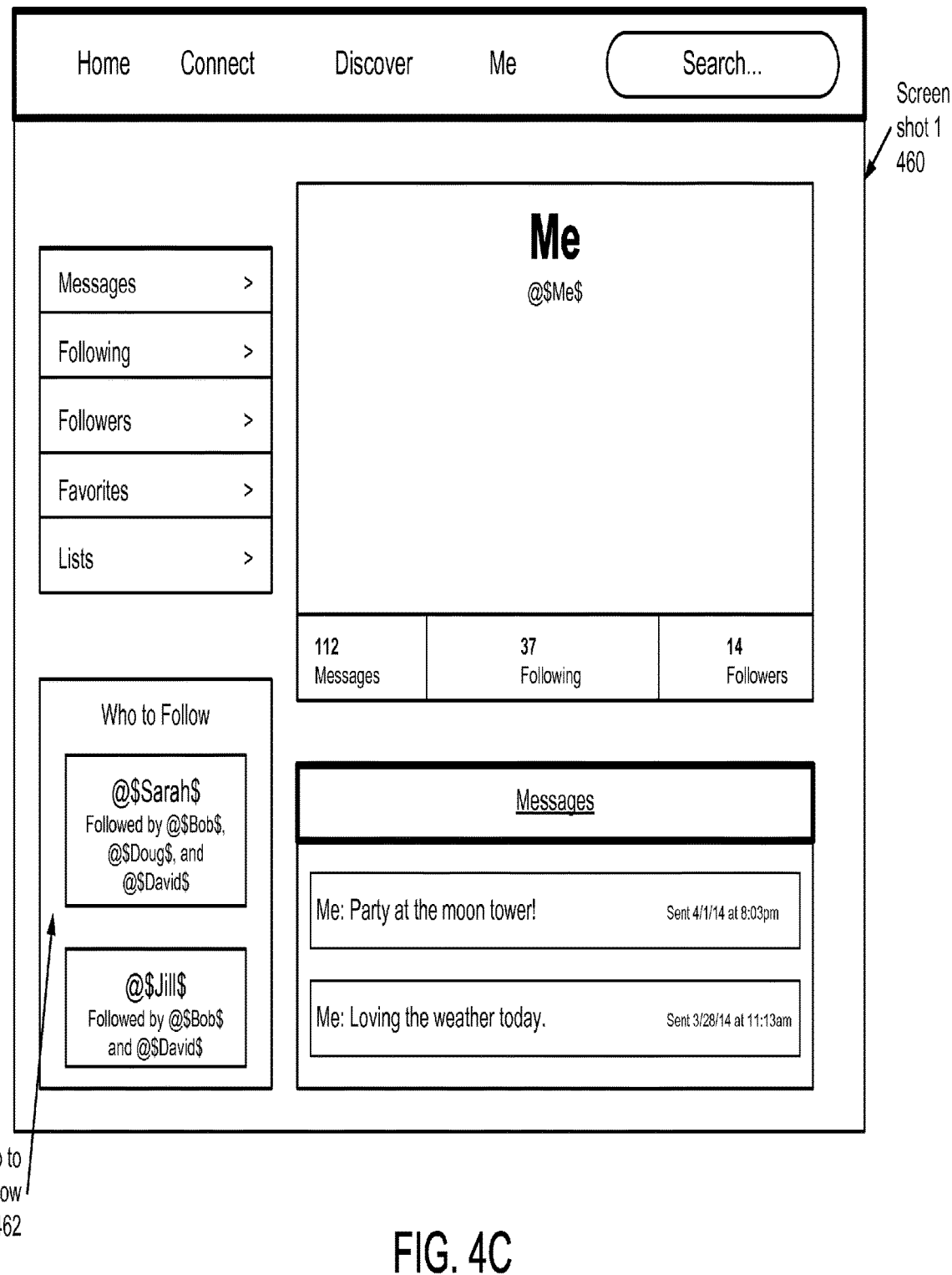
Figure 4D:
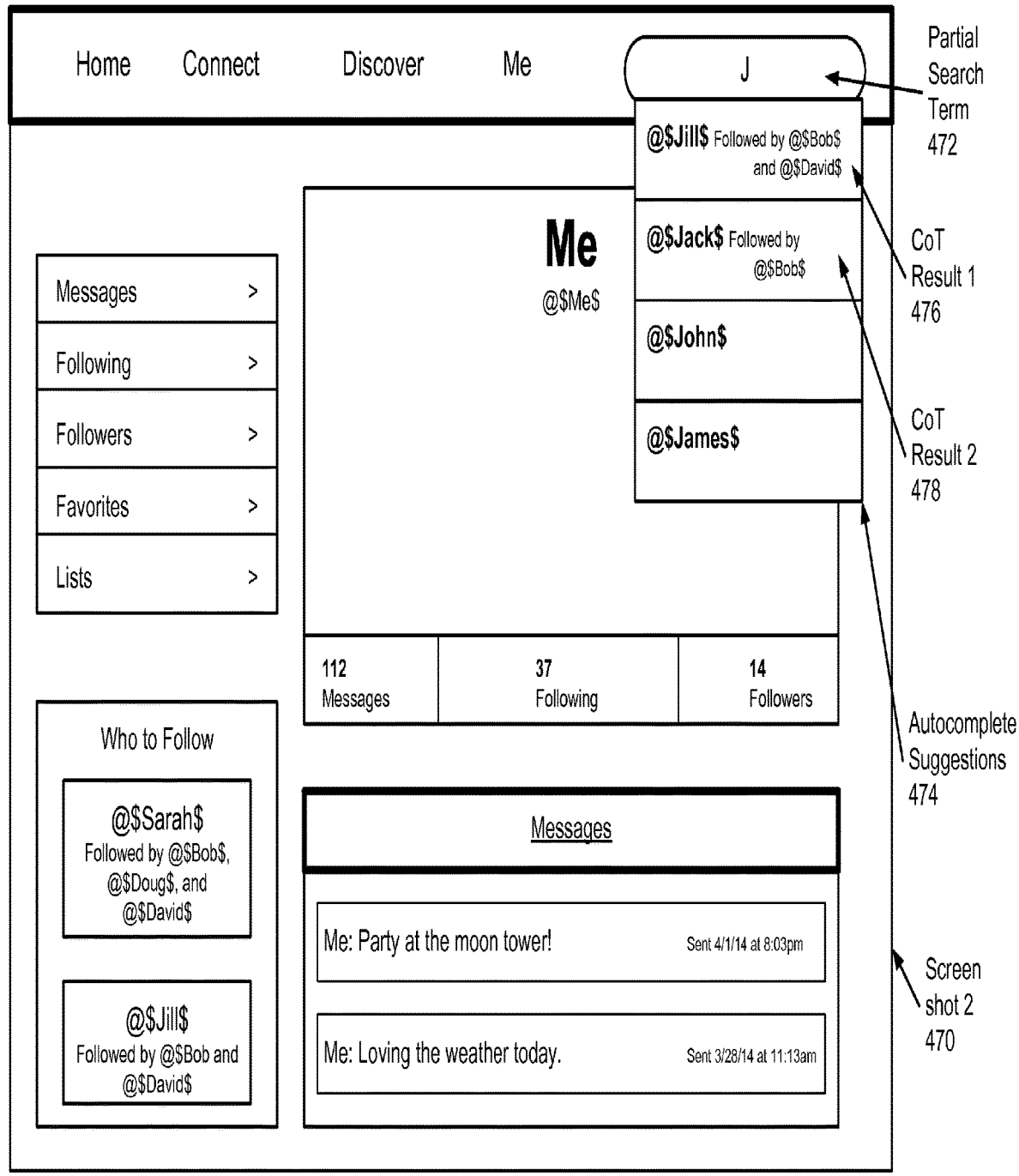
Figure 4E:
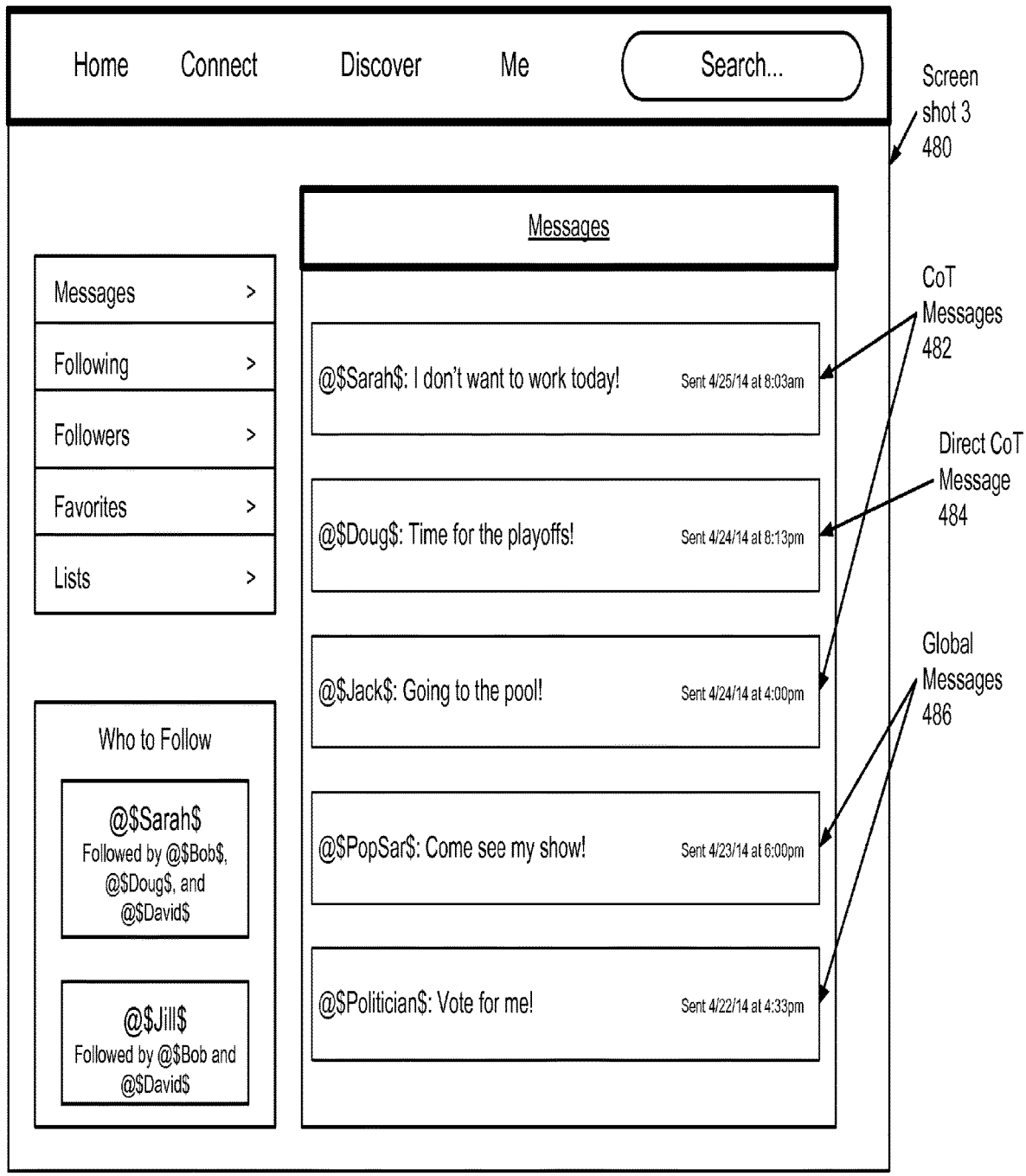

Once CoT (450) is generated it may be used in many different ways to refine, improve, augment, filter, or otherwise affect various functionalities of a social network. FIGS. 4C, 4D, and 4E show examples of how CoT (450) may be used. FIG. 4C shows screenshot 1 (460) showing an example screen of a home page on a social network for the @$Me$ account. Various links, messages, and a search bar are shown. Of particular interest is who to follow (462), Who to follow (462) suggests accounts for "Me" to follow. The accounts which appear in the who to follow (462) box are selected using a variety of criteria. In this example, one of the criteria is that the accounts are members of CoT (450). Specifically, @$Sarah$ and @$Jill$ (who are members of CoT (450)) are suggested as accounts for "Me" to follow. Additionally, @$Sarah$ is shown as being followed by @$Bob$, @$Doug$, and @$David$, while @$Jill$ is shown as being followed by @$Bob$ and @$David$. This information may be derived from Col (450), and provides highly relevant suggestions for "Me."

Moving to FIG. 4D, screenshot 2 (470) is shown. Screenshot 2 (470) is a second example of a screen from a page on a social network for the @$Me$ account. In screenshot 2 (470), the user has begun to perform a search. Specifically, as shown by partial search term (472) the user has thus far only, typed in the letter "J". With so little information, it is challenging to provide relevant suggestions as to what the user might be searching for. Autocomplete suggestions (474) attempt to do just that. Specifically, while the initial results for the autocomplete suggestions (474) may be identified using any suitable criteria, the initial results may be filtered against the members of CoT (450). Thus, after filtering against CoT (450), CoT result 1 (476) is the @$Jill$ account. Additionally, information is provided indicating that the @$Bob$ and @$David$ account follow @$Jill$. Similarly, CoT result 2 (478) is the @$Jack$ account. Additionally, information is provided indicating that the @$Bob$ account follows @$Jack$. The two remaining results in autocomplete suggestions (474), @$John$ and @$James$, are not members of CoT (450) and therefore, no additional information is provided regarding who they are followed by. The @$John$ and @$Jack$ accounts may be selected using any manner now known or later developed.

Moving on to FIG. 4E, screenshot 3 (480) is shown. Screenshot 3 (480) is a third example of a screen from a page on a social network for the @$Me$ account. In screenshot 3 (480), the user is viewing recent activity, news, or some other similar service. Specifically, messages are shown in screenshot 3 (480). The messages that are shown may be selected using a variety of criteria and then filtered against CoT (450) to identify the most relevant messages. In one or more embodiments of the invention, the messages ma be selected using a secondary graph of messages. Specifically, CoT messages (482) are the messages identified by filtering against CoT (450), as they were sent by two accounts in CoT (450) (e.g., @$Sarah$ and @$Jack$). Direct CoT message (484) is a message from an account (e.g., @$Doug$) in the CoT that "Me" directly follows. Finally, global messages (486) are messages from accounts that are not in CoT (450), and may be selected based on a variety of factors including, but not limited to: popularity, relevancy, age, gender, location, etc.

Figure 5:
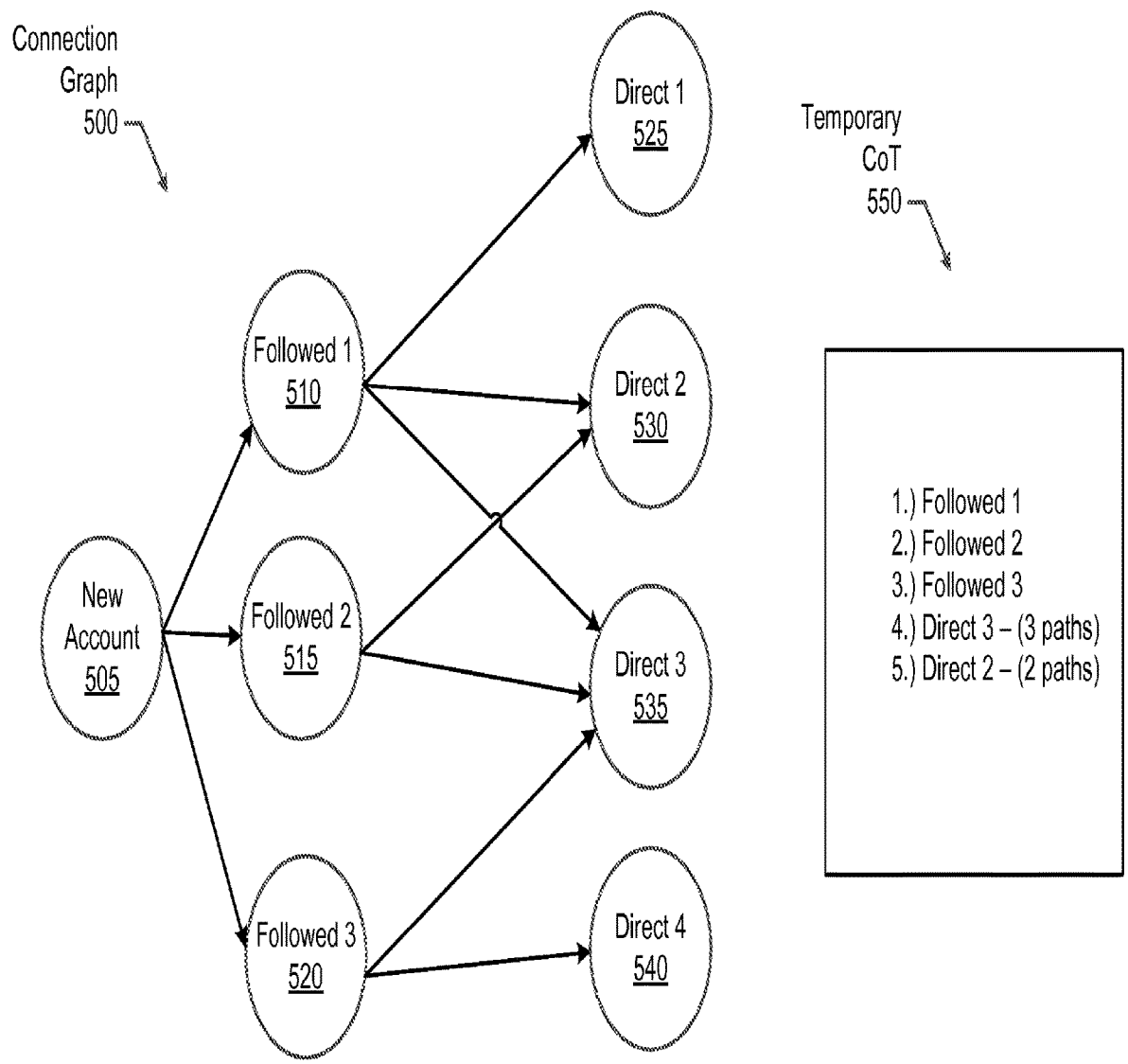
FIG. 5 shows a computing system in accordance with one or more embodiments of the invention.

FIG. 5 shows an example of how a temporary CoT may be generated. Specifically, connection graph (500) is shown. Connection graph (500) has been generated for new account (505) by taking the accounts that new account (505) directly follows (e.g., followed 1 (510), followed 2 (515), and followed 3 (520)), and accessing each of their corresponding CoTs. Then, the accounts that each of those accounts directly follow (e.g., direct 1 (525), direct 2 (530), direct 3 (535), and direct 4 (540)) are added to connection graph (500). Once connection graph (500) is generated, the number of paths to each of the accounts in connection graph (500) are calculated to generate temporary CoT (550). In this example, the followed accounts do not receive a weight, yet are included in the temporary CoT (550) because the user has directly indicated that they "trust" those accounts by following them, and therefore they are at the top of temporary CoT (550). Further, temporary CoT (550) has been limited to the top 5 accounts. Direct 3 (535) receives a weight of 3 because there are three paths leading to direct 3 (535), from followed 1 (510), followed 2 (515), and followed 3 (520), Similarly, direct 2 (530) receives a weight of 2 because there are two paths leading to direct 2 (530), from followed 1 (510) and followed 2 (515), The remaining accounts each receive a weight of one, as only one path exists to them, and due to the limit of 5 accounts already being reached, are not featured in temporary CoT (550). Once generated, temporary CoT (550) may be used in any of the ways as a "normal" CoT. Temporary CoT (550) is much easier and faster to generate than a normal CoT, and therefore may be generated dynamically in real time. Further, temporary CoT (550) may be updated for each new account that new account (505) follows (i.e., followed 4 (not shown)). Temporary CoT (550) may be replaced once a "normal" CoT has been generated for new account (505).

Figure 6:
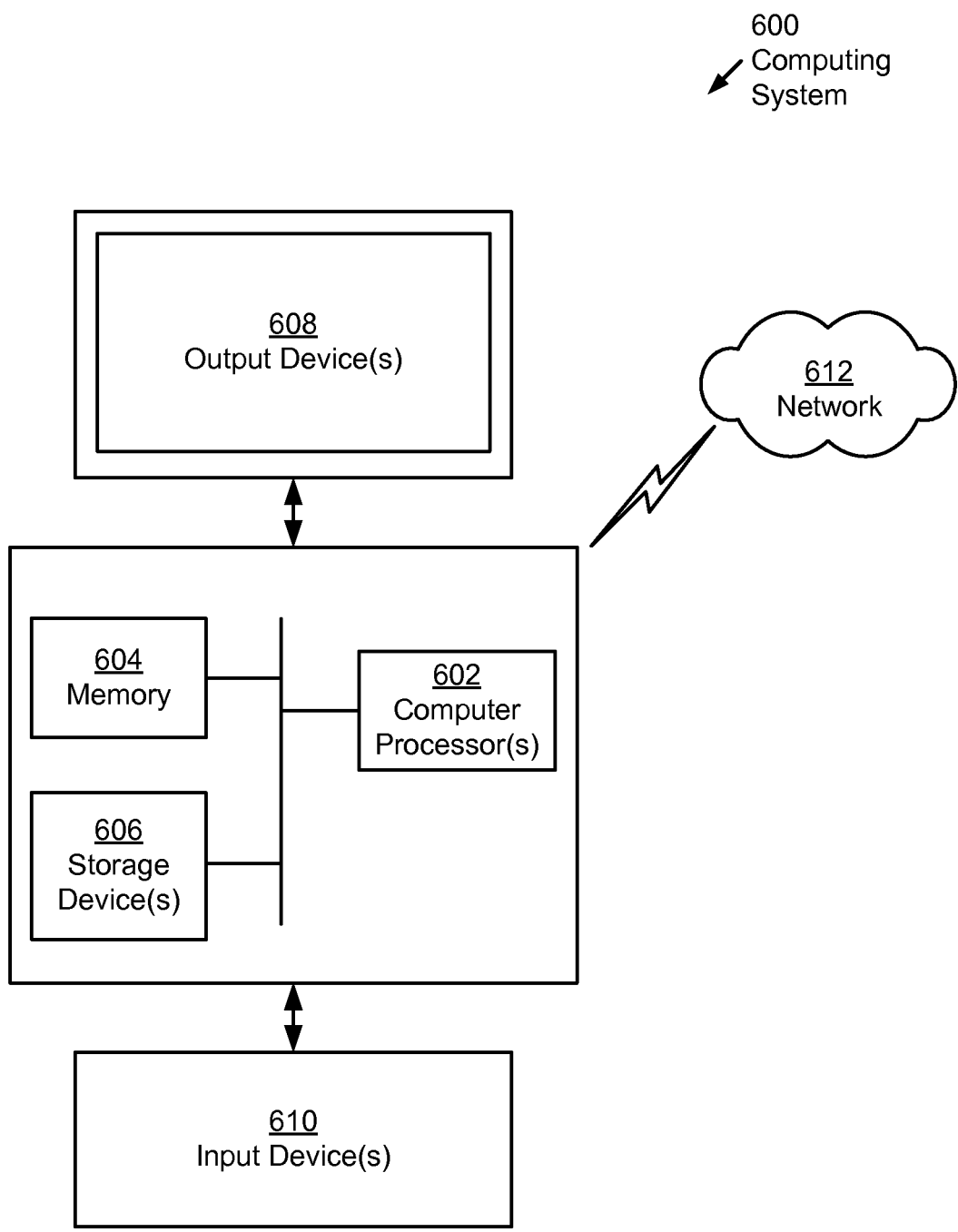
FIG. 6 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    receiving, by a computing system, a request for a circle of trust (CoT) of a context account of a messaging platform;
    generating, in response to the request, the CoT for the context account, the generating comprising:
        identifying a primary graph for the context account, wherein the primary graph comprises a plurality of nodes representing accounts of the messaging platform and edges representing connections between accounts;
        determining, for each node of the plurality of nodes, a final value for each node for the node that represents how many random walks along the edges of the primary graph that begin at a node representing the context account would end at the node, the final value for the node being specific to the node representing the context account;
        ranking the plurality of nodes based on the respective final values, the largest final values resulting in the highest rankings; and
        selecting a specified number of the plurality of nodes based on the ranking to generate the CoT for the context account, the CoT of the context account comprising accounts of the messaging platform corresponding to the selected nodes;
    determining interests associated with one or more of the accounts in the CoT; and assigning one or more of the determined interests to the context account.

2. The method of claim 1, wherein determining a final value for each node comprises:
performing a plurality of random walks along edges of the primary graph, wherein each random walk begins at a node representing the context account, and the primary graph is a directed graph; and
determining as the final value of each node of the plurality of nodes a value that indicates a count of random walks of the plurality of random walks that end on that node using the directed graph.

3. The method of claim 1, wherein the number of steps in the random walks is limited to a predetermined limit.

4. The method of claim 1, wherein assigning one or more of the determined interests to the context account comprises:
determining a common interest among a plurality of the accounts in the CoT; and
assigning the common interest to the context account.

5. The method of claim 4, wherein determining the common interest comprises accessing an account repository for each account in the CoT to retrieve account data items comprising interests of each corresponding user.

6. The method of claim 1, further comprising, using the CoT to determine content to provide to the context account, wherein using the CoT to determine content to provide to the context account comprises promoting content generated by accounts of the CoT when determining a message stream for the context account.

7. The method of claim 1, wherein a member of the CoT is ranked higher in response to a search request from the context account than a non-member.

8. The method of claim 1, further comprising: suggesting one or more accounts to the context account based on the accounts of the CoT.

9. The method of claim 1, wherein selecting the specified number of the plurality of nodes further comprises:
identifying a secondary graph comprising the specified number of the plurality of nodes;
generating a secondary CoT using the secondary graph; and
identifying a plurality nodes to provide to the context account using the secondary CoT.

10. The method of claim 1, wherein the final value for a particular node of the plurality of nodes with respect to the node for the context account is different than another final value for the particular node with respect to another node for another context account.

11. The method of claim 1, wherein selecting the specified number of the plurality of nodes comprises selecting the specified number of the highest ranked nodes from the plurality of nodes to generate the CoT for the context account, the CoT of the context account comprising accounts of the messaging platform corresponding to the selected highest ranked nodes.

12. One or more non-transitory computer readable storage media including computer program code that, when executed on a computing system, causes the computing system to perform operations comprising:
receiving, by computing system, a request for a circle of trust (CoT) of a context account of a messaging platform;
generating, in response to the request, the CoT for the context account, the generating comprising:
identifying a primary graph for the context account, wherein the primary graph comprises a plurality of nodes representing accounts of the messaging platform and edges representing connections between accounts;
determining, for each node of the plurality of nodes, a final value for the node that represents for the node that represents how many random walks along the edges of the primary graph that begin at a node representing the context account would end at the node, the final value for the node being specific to the node representing the context account;
ranking the plurality of nodes based on the respective final values, the largest final values resulting in the highest rankings, and
selecting a specified number of the plurality of nodes based on the ranking to generate the CoT for the context account, the CoT of the context account comprising accounts of the messaging platform corresponding to the selected nodes;
determining interests associated with one or more of the accounts in the CoT; and
assigning one or more of the determined interests to the context account.

13. The non-transitory computer readable storage media of claim 12, wherein determining a final value for each node comprises:
performing a plurality of random walks along edges of the primary graph, wherein each random walk begins at a node representing the context account, and the primary graph is a directed graph; and
determining as the final value of each node of the plurality of nodes a value that indicates a count of random walks of the plurality of random walks that end on that node using the directed graph.

14. The non-transitory computer readable storage media of claim 12, wherein the number of steps in the random walks is limited to a predetermined limit.

15. The non-transitory computer readable storage media of claim 12, wherein assigning one or more of the determined interests to the context account comprises:
determining a common interest among a plurality of the accounts in the CoT; and
assigning the common interest to the context account.

16. The non-transitory computer readable storage media of claim 15, wherein determining the common interest comprises accessing an account repository for each account in the CoT to retrieve account data items comprising interests of each corresponding user.

17. The non-transitory computer readable storage media of claim 12, further comprising, using the CoT to determine content to provide to the context account, wherein using the CoT to determine content to provide to the context account comprises promoting content generated by accounts of the CoT when determining a message stream for the context account.

18. The non-transitory computer readable storage media of claim 12, wherein a member of the CoT is ranked higher in response to a search request from the context account than a non-member.

19. The non-transitory computer readable storage media of claim 12, further comprising: suggesting one or more accounts to the context account based on the accounts of the CoT.

20. The non-transitory computer readable storage media of claim 12, further comprising:
identifying a secondary graph comprising the specified number of the plurality of nodes;

generating a secondary CoT using the secondary graph; and identifying a plurality nodes to provide to the context account using the secondary CoT.

21. A system comprising:

one or more computing devices and one or more computer readable storage media configured to perform operation comprising:

receiving, by a computing device, a request for a circle of trust (CoT) of a context account of a messaging platform;

generating, in response to the request, the CoT for the context account, the generating comprising:

identifying a primary graph for the context account, wherein the primary graph comprises a plurality of nodes representing accounts of the messaging platform and edges representing connections between accounts;

determining, for each node of the plurality of nodes, a final value for the node that represents how many random walks along the edges of the primary graph that begin at a node representing the context account would end at the node, the final value for the node being specific to the node representing the context account;

ranking the plurality of nodes based on the respective final values, the largest final values resulting in the highest rankings, and selecting a specified number of the plurality of nodes based on the ranking to generate the CoT for the context account, the CoT of the context account comprising accounts of the messaging platform corresponding to the selected nodes;

determining interests associated with one or more of the accounts in the CoT; and assigning one or more of the determined interests to the context account.

22. The system of claim 21, wherein determining a final value for each node comprises:

performing a plurality of random walks along edges of the primary graph, wherein each random walk begins at a node representing the context account, and the primary graph is a directed graph; and determining as the final value of each node of the plurality of nodes a value that indicates a count of random walks of the plurality of random walks that end on that node using the directed graph.

23. The system of claim 21, wherein the number of steps in the random walks is limited to a predetermined limit.

24. The system of claim 21, wherein assigning one or more of the determined interests to the context account comprises:

determining a common interest among a plurality of the accounts in the CoT; and assigning the common interest to the context account.

25. The system of claim 24, wherein determining the common interest comprises accessing an account repository for each account in the CoT to retrieve account data items comprising interests of each corresponding user.

26. The system of claim 21, further comprising, using the CoT to determine content to provide to the context account, wherein using the CoT to determine content to provide to the context account comprises promoting content generated by accounts of the CoT when determining a message stream for the context account.

27. The system of claim 21, wherein a member of the CoT is ranked higher in response to a search request from the context account than a non-member.

28. The system of claim 21, further comprising: suggesting one or more accounts to the context account based on the accounts of the CoT.

29. The system of claim 21, wherein selecting the specified number of the plurality of nodes further comprises:

identifying a secondary graph comprising the specified number of the plurality of nodes;

generating a secondary CoT using the secondary graph; and identifying a plurality nodes to provide to the context account using the secondary CoT.

* * * * *

UNITED STATES PATENT AND TRADEMARK OFFICE
CERTIFICATE OF CORRECTION

PATENT NO. : 11,290,551 B1
APPLICATION NO. : 17/013233
DATED : March 29, 2022
INVENTOR(S) : Pankaj Gupta, Aneesh Sharma and Ashish Goel Page 1 of 1

It is certified that error appears in the above-identified patent and that said Letters Patent is hereby corrected as shown below:

In the Claims

Column 16, Line 52, Claim 1, delete "value for each node" and insert -- value --.

Column 17, Line 43, Claim 9, after "plurality" insert -- of --.

Column 19, Line 3, Claim 20, after "plurality" insert -- of --.

Column 20, Line 39, Claim 29, after "plurality" insert -- of --.

Signed and Sealed this
Twenty-first Day of June, 2022

Katherine Kelly Vidal
*Director of the United States Patent and Trademark Office*